United States Patent
Laurent et al.

(10) Patent No.: US 11,665,143 B2
(45) Date of Patent: May 30, 2023

(54) METHOD, DEVICE AND MEDIUM FOR TRANSMISSION OF FRAGMENTED IP ADDRESSES AND DATA PACKETS THROUGH A NETWORK

(71) Applicant: COMMISSARIAT A L'ENERGIE ATOMIQUE ET AUX ENERGIES ALTERNATIVES, Paris (FR)

(72) Inventors: Frédéric Laurent, Jouy en Josas (FR); Alexis Olivereau, Orsay (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 52 days.

(21) Appl. No.: 16/650,348

(22) PCT Filed: Sep. 11, 2018

(86) PCT No.: PCT/EP2018/074417
§ 371 (c)(1),
(2) Date: Mar. 24, 2020

(87) PCT Pub. No.: WO2019/072470
PCT Pub. Date: Apr. 18, 2019

(65) Prior Publication Data
US 2021/0211413 A1 Jul. 8, 2021

(30) Foreign Application Priority Data
Oct. 10, 2017 (FR) .................. 1759452

(51) Int. Cl.
*H04L 9/12* (2006.01)
*H04L 9/18* (2006.01)
(Continued)

(52) U.S. Cl.
CPC ...... *H04L 63/0421* (2013.01); *H04L 12/4633* (2013.01); *H04L 45/24* (2013.01); *H04L 63/0428* (2013.01); *H04L 63/0876* (2013.01)

(58) Field of Classification Search
CPC . H04L 63/0421; H04L 12/4633; H04L 45/24; H04L 63/0428; H04L 63/0876;
(Continued)

(56) References Cited

U.S. PATENT DOCUMENTS 6,266,704 B1 * 7/2001 Reed .................. H04L 45/00
709/238
7,171,493 B2 * 1/2007 Shu ................... H04L 12/4633
709/238

(Continued)

FOREIGN PATENT DOCUMENTS

CN 106101107 A 11/2016
JP 2007-5898 A 1/2007
(Continued)

OTHER PUBLICATIONS

Dynamic Probabilistic Packet Marking Based on PPM. Bo. IEEE. (Year: 2009).*
(Continued)

*Primary Examiner* — Venkat Perungavoor
(74) *Attorney, Agent, or Firm* — BakerHostetler

(57) ABSTRACT

An enhanced device and method for anonymization also offering improved security properties of data exchanged bidirectionally between a client and a server in a communication network. A protocol in respect of data exchange between client and server which relies on a two-level third-party servers architecture as well as on a system for bidirectional communication between the client and the server through these two levels of third-party servers.

12 Claims, 8 Drawing Sheets

(51) Int. Cl.
*H04L 9/40* (2022.01)
*H04L 12/46* (2006.01)
*H04L 45/24* (2022.01)
*H04L 9/34* (2006.01)

(58) Field of Classification Search
CPC ... H04L 45/72; H04L 45/74; H04L 29/12216; H04L 63/0236; H04L 29/06585; H04L 61/6068; H04L 67/1023
See application file for complete search history.

(56) References Cited

U.S. PATENT DOCUMENTS

| | | | | |
|---|---|---|---|---|
| 2004/0093521 | A1* | 5/2004 | Hamadeh | H04L 69/161 726/22 |
| 2012/0166582 | A1* | 6/2012 | Binder | G06F 21/602 709/217 |
| 2013/0022043 | A1* | 1/2013 | Lee | H04L 63/0428 370/389 |
| 2014/0040421 | A1* | 2/2014 | Baldwin | H04L 65/60 709/217 |
| 2017/0171154 | A1* | 6/2017 | Brown | H04L 67/02 |
| 2018/0287993 | A1* | 10/2018 | Zhu | H04L 29/12 |
| 2019/0306131 | A1* | 10/2019 | Dolev | H04L 63/0428 |

FOREIGN PATENT DOCUMENTS

| | | |
|---|---|---|
| JP | 2008-250931 A | 10/2008 |
| WO | 00/27086 A2 | 5/2000 |
| WO | 2015/177789 A1 | 11/2015 |

OTHER PUBLICATIONS

SAAMAN: Scalable Address Autoconfiguration in Mobile Ad Hoc Networks. Hussain. Springer. (Year: 2011).*
Garlic Cast: Lightweight and Decentralized Anonymous Content Sharing. Qian. IEEE. (Year: 2016).*
OnionSIP: Preserving Privacy in SIP with Onion Routing. Fakis. J. UCS. (Year: 2017).*
IP address lookup using bit-shuffled trie. Pao. Elsvier. (Year: 2014).*
CN106101107. English Translation. (Year: 2016).*
CN109413089. English Translation. (Year: 2019).*
JP2006254153. English Translation. (Year: 2007).*
Deep learning based cyber bullying early detection using distributed denial of service flow. Zaib. Springer. (Year: 2021).*
Detecting and Blocking Onion Router Traffic Using Deep Packet Inspection. Saputra. IEEE. (Year: 2016).*
Dynamic Multipath Onion Routing in Anonymous Peer-To-Peer Overlay Networks. Landsiedel. IEEE. (Year: 2007).*
The Application of Onion Routing in Anonymous Communication. Fang. IEEE. (Year: 2010).*
Dingledine, et al., "Tor: The Second-Generation Onion Router", 2004.
Goldschlag, et al., "Hiding Routing Information—Onion Routing", 1996.
Dingledine, et al., "Tor: The Second-Generation Onion Router", CiteSeer, 2004.
Goldschlag, et al., "Hiding Routing Information—Onion Routing", Workshop on Information Hiding, 1996.
English translation of Notice of Rejection issued in Japanese Patent Application No. 2020-520305 dated May 31, 2022.
Fang, et al., "The Application of Onion Routing in Anonymous Communication", 2010 Second International Conference on Multimedia and Information Technology, Apr. 24, 2010.

* cited by examiner

METHOD, DEVICE AND MEDIUM FOR TRANSMISSION OF FRAGMENTED IP ADDRESSES AND DATA PACKETS THROUGH A NETWORK

CROSS-REFERENCE TO RELATED APPLICATIONS

This application is a National Stage of International patent application PCT/EP2018/074417, filed on Sep. 11, 2018, which claims priority to foreign French patent application No. FR 1759452, filed on Oct. 10, 2017, the disclosures of which are incorporated by reference in their entirety.

FIELD OF THE INVENTION

The invention relates to the field of communications and, more particularly, that of communication protocols.

BACKGROUND

Preventing attacks on private data has become a priority in communications, and equally sought are an assurance of anonymized access to the Internet and secured confidentiality of the data exchanged.

Also, it is desirable to mask the identity of the operators of the equipment used to access services (the term "service" being understood for the present description in a broad sense potentially designating an application service or an equipment item) or more generally used to conduct any operation, the knowledge of which can be used to identify the operator. In order to mask the identity of the sources, the elements which identify the equipment, even indirectly even if the communication of the latter were encrypted, must be rendered unusable to a third-party observer. Among these potential identification elements, the network metadata and particularly the source and destination IP addresses of a communication are those whose use is most likely to compromise the anonymity (or the "privacy" to use the accepted English term) of the operator. Indeed, the source and destination IP addresses uniquely identify the source and the destination of a communication, allow them to be physically located, are relatively permanent, and remain observable by a third party over all of the communication path.

There are several solutions that offer a more or less high guarantee of anonymized access to the Internet. The best known solutions are the conventional proxy-based services which display the IP address of the proxy and not that of the peripheral device used, or the Tor ("The Onion Router") network or even the I2P ("Invisible Internet Project") network operating on the known "garlic routing" mechanism derived from Tor.

These solutions rely on a virtual private network or VPN being put in place between the user and the service via a conventional proxy or via several proxy servers (for Tor or I2P) which are placed in series and are responsible for encapsulating the communications between the user and the service to which he or she wants access or with which he or she wants to communicate. For each communication, these solutions each have a single entry and exit point which are both potential vulnerabilities.

The Tor network presented in the article by R. Dingledine, N. Mathewson and P. Syverson, "Tor: The Second-Generation Onion Router", 2004, is based on the so-called onion routing technology described for example in the article "Onion Routing" by D. Goldschlag, M. Reed and P. Syverson, Hiding Routing Information, 1996. FIG. 1 presents, in a simplified example, the setting up of the routing in a Tor network (100) in which a source Alice (A) wants to set up a communication with a destination Bob (B) by the Tor network through three intermediate routers or proxies OR1, OR2 and OR3. In order to communicate securely with Bob via the Tor infrastructure, Alice contacts the routers OR1, OR2 and OR3 in succession. OR1 is contacted directly by Alice, while OR2 is contacted via OR1 and OR3 is contacted via OR1 and OR2. This contact allows for the creation of a circuit or path made up of three segments A⇔OR1 (102), OR1⇔OR2 (104), OR2⇔OR3 (106). The downlink data packets from Alice to Bob are first of all transmitted over the first segment (102) between A and OR1 and received by OR1. They are then retransmitted by OR1 over the second segment (104) between OR1 and OR2. The downlink packets received by OR2 from the second segment (104) are then retransmitted by OR2 over the third segment (106) between OR2 and OR3. The downlink packets received by OR3 from the third segment (106) between OR2 and OR3 are finally retransmitted by OR3 to Bob. The associated encryption operations make it possible to ensure that only the last router before the destination (here OR3) can observe the downlink data packets from Alice to Bob.

In the direction of an uplink from Bob to Alice, reciprocal routing operations are employed. Similarly the associated encryption operations make it possible to ensure that only the last router before the destination (in this case, OR1) can observe the uplink data packets from Bob to Alice.

Although the principle according to the Tor approach makes it possible to limit the risk of attacks (to the last router before the destination), these anonymization services are not of "privacy-by-design" protection type, to use the accepted English term, and a compromise of the proxies, whether it be intentional or following an attack, remains possible. Indeed, a compromise, either direct of the proxies of a conventional VPN system or via a simple procedure of correlation of the incoming and outgoing proxies in the Tor case, allows an interceptor to at least find the user. These anonymization services therefore rely essentially on the trust accorded by the users to the proxies. Now it is well known that some proxies, even within Tor, are compromised.

Moreover, it should be noted with respect to the protection of data confidentiality, that such a service is independent of the private data protection service. A communication can benefit from a confidentiality service (with data transmitted encrypted) which is efficient even though its metadata (the addresses of the sender and of the receiver) leave the possibility of knowing of the existence of a transaction between the sender/receiver actors. There are very many more or less sophisticated secure messaging solutions relying on "end-to-end cryptography" to use the accepted English term. In the network layer of the OSI ("Open System Interconnection") model the IPsec ESP (Encapsulating Security Payload, RFC 4303) protocol represents the encryption technology most widely used in order to guarantee a confidentiality service. When it is used in a tunnel mode which is the conventional approach of the virtual private networks, the ESP protocol ensures the confidentiality not only of the data transported by the network layer, but also that of the network header itself, because it is all of the IP packet transported by the VPN which is encrypted and encapsulated in a new packet intended for the VPN gateway.

This solution based on a VPN making it possible to ensure the confidentiality of the data is not however satisfactory for guaranteeing anonymity. Indeed, a VPN service secures the metadata only between a user and the VPN gateway, and the recipient of the encapsulated packet and the surrounding nodes see all of the original packet. Furthermore, the VPN gateway also represents a "single point of failure" (SPOF), to use the accepted English term, in as much as the possible compromise thereof allows for the knowledge of all the data and metadata that are assumed protected.

The patent application WO 2015/177789 A1 proposes a method for setting up, in a communication network, a private interconnection between a source and a destination by using a shared secret in order to secure the data transmission from the sender to the receiver. Each data packet to be sent is cryptographically split into two or more data fragments, which fragments are then sent from the sender to the receiver over fully or partially independent network paths or circuits. While this solution presents design similarities with the present invention, it targets a different application and therefore provides no guarantee in terms of privacy. Indeed:

its sole target is to offer a data confidentiality service, and it does not include any privacy functionality. So, a priori, a third party placed on the path taken by the packets is able to know that there is a communication between the user and the service. In particular, nowhere is there any mention of a mechanism making it possible to mask the address of the sender or that of the receiver in the sending of the encrypted data over the fully or partially independent paths;

the application of this solution is envisaged only in a collaboration between the user and the defined service and is not applicable to generic communications between a user and any service;

furthermore, the text includes no technical element that makes it possible to guarantee that a crossing of circuits which are created is impossible and that a compromise of a few "Points of Presence" would not make it possible to break the confidentiality of the data.

Moreover, it is essential to note that the solutions mentioned above are based on cryptography technologies which use increasingly longer encryption keys, and that increasingly more computation power will be needed to break these keys via so-called "brute-force attacks", to use the accepted English term. In addition to a theoretical medium-term threat that the quantum computer represents for breaking these keys instantaneously, recent news has revealed the capacity of the third parties to break certain keys or even directly recover these keys upon their generation (like the revealed operations of GCHQ and of the NSA for recovering the encryption keys of SIM cards between 2010 and 2011).

Furthermore, in the context of services aiming to ensure an anonymized access to the Internet, the multiple encryption levels induce a relatively slow service. Because of the multiple computations necessary for the encryption/decryption and the various proxies placed in series, the use of Tor or I2P greatly degrades the user experience. For example, the transfer of large files or the use of P2P protocols (like "torrent") are not authorized because they threaten the "economic" model of these systems.

Thus, it emerges from the prior art that anonymization and security are two functions which are generally implemented exclusively in communications between a sender and a receiver.

There is then the need for a global solution which combines the two functions of anonymized access to a communication network and security of the confidentiality of the data exchanged. The present invention addresses this need.

SUMMARY OF THE INVENTION

One object of the present invention is to propose a reinforced anonymization device and method also offering enhanced data security properties.

The present invention allows for the securing and the reinforcement of the anonymity of data exchanged bidirectionally between a client and a server in a communication network. It proposes a data exchange protocol between client and server which is based on a third-party server architecture and on a bidirectional communication system between the client and the server through these third-party servers.

The method of the invention is based on the observation that an exchange of information is characterized by a triplet (user, service, content) or respectively (sender, receiver, data) and that the knowledge, if only of the first two elements of this triplet, can constitute information that can be monetized by a third party. Also, to guarantee the anonymity and the security of the data, the method of the invention allows all of the triplet—identity of the sender/user, identity of the receiver/service, data/content—to be protected. The general principle of the invention consists in a segmentation of the information from the output of the sending terminal where the user has multiple interfaces allowing him or her to access a network like the Internet (configuration known by the English term "multihoming"). While reinforcing the security of each element individually, the present invention aims to isolate to the maximum each element of the triplet and guarantee that a third party cannot have knowledge of more than one element of this triplet at a time. Thus, that means an interception is of virtually zero benefit.

The invention will be advantageously applicable for equipment items which, in addition to a main network connection, offer additional network connections of 4G and/or WIFI type. In the medium term, the advent of 5G and the roll-out of the networks of Internet of Things (IoT) type which will offer pervasive and/or additional interfaces, will allow other implementations of the invention.

Moreover, the existing systems both of anonymization (privacy) and of securing (confidentiality) of the communications are two immediate applications.

Advantageously, the invention can be operated in a consumer anonymization system such as Tor or I2P which has theoretical performances (latency, bit rates, etc.) more in line with the modern Internet uses. Furthermore, these systems are not as yet used in the professional environment. Now, economic intelligence activities can easily be conducted by monitoring the Internet activity of a group (for example probes on submarine cables). An anonymization system which associates security functions, such as that of the invention which is "privacy-by-design", can be incorporated in the offering of the operators.

Finally, the distributed nature of the system which is based on three complementary elements makes it possible to envisage an implementation by Internet access providers, and then allow a response to legal issues through log crossover. By also allowing for a reinforcement of the security level in collaborative mode, the device of the invention can offer an alternative to pure cryptography (which presents the risks of intercepted keys), or even allow an easy deployment of the professional mobile networks (PMR) by using the current frequency bands of the 4G operators.

Thus, the present invention aims to address the inadequacies of the known privacy solutions which require their users to place a blind trust in the anonymization service used. Advantageously, by its implementation, the proposed method allows a user to retain total control of the information which is routed by the different trusted third parties and it eliminates the numerous single points of failure that exist in the current solutions. The invention removes the obligation for the user to have to place trust in the different third parties to guarantee his or her anonymity.

Advantageously, the device of the invention, when implemented in non-cooperative mode on a single equipment item of client type, introduces security properties over a large part of all of the privacy-by-design protection system.

In an alternative implementation in cooperative mode on equipment items of client and server type, the invention allows for operation in collaboration with a security system (of shared secret type to which cryptography can be added) then introducing, into a secure communication system, privacy-by-design protection properties.

The proposed invention sets out on the one hand to isolate each element of the triplet (sender, receiver, data) so that a third party cannot reconsolidate it. On the other hand, it uses a shared secret mechanism to guarantee that, even in the event of compromise of an entity of the system, a third party cannot access more than one of the elements of the triplet. Furthermore, in addition to the fact that the invention offers this end-to-end guarantee in collaborative mode it also adds these properties as close as possible to the service in non-collaborative mode (except for the return entry point).

Additional advantages of the use of the shared secret mechanism are also:
- adding an additional level of security which can complement the conventional end-to-end encryption in the application layer. In addition, this mechanism guarantees, unlike the encryption based on encryption keys, that the anonymity will not be able to be compromised by data sent by the application layers of the user which would have been decrypted (typically: an https request with content recovered by cookies, etc.);
- necessitating less complex computations than the minimum four encryption levels of Tor and of its derivatives and therefore reducing the latency compared to the common privacy solutions;
- reducing the legal risks associated with the hosting of output nodes (excluding return node) because, in some variants, the latter do not actually see all of the traffic.

To obtain the results sought, a method and a device for implementing the method are proposed. In particular, an anonymization method is proposed for communicating data in an IP communication network, from a sender having a plurality of network interfaces to a receiver having at least one IP address, the method comprising the steps of:
- transmitting, by the plurality of network interfaces, fragments of the IP address of the receiver to a plurality of servers, called second-level servers, according to a first shared secret mechanism;
- transmitting, by each second-level server, the received IP address fragment to a single server called master server, the master server being able to reconstruct the IP address of the receiver;
- transmitting, by the plurality of network interfaces, data fragments of a data packet, to a plurality of servers called first-level servers, according to a second shared secret mechanism;
- transmitting, by each first-level server, the received data fragment to a second-level server from among the plurality of second-level servers;
- transmitting, by each second-level server, the received data fragment to the master server, the master server being able to reconstruct the data packet from all the received data fragments; and transmitting, from the master server, the data packet to the receiver.

According to embodiments:

the step of transmitting, by the plurality of network interfaces, data fragments to the plurality of first-level servers, consists in:
- transforming the data packet to be transmitted into as many data fragments as there are network interfaces, said transformation of the packet being done according to the second shared secret mechanism; and
- transmitting each data fragment to a first-level server via a different network interface, each first-level server being assigned to a network interface;

the method comprises, before the step of transformation of a data packet, a step allowing the sender to select and authenticate as many first-level servers as there are network interfaces from among the plurality of first-level servers, and to set up a single communication circuit between each network interface and a selected first-level server;

the method comprises a step allowing the sender to select at least as many second-level servers as there are selected first-level servers, and to assign a selected second-level server to each selected first-level server, and a step making it possible to inform each first-level server of the second-level server which is assigned to it;

the step of transmitting, by each first-level server, the received data fragment to a second-level server consists in transmitting a data fragment from a first-level server to a second-level server which is assigned to it, said second-level server having received from the sender a fragment of the IP address of the receiver according to the first shared secret mechanism;

the step of transmitting, to a plurality of second-level servers, fragments of the IP address of the receiver, comprises a step allowing the sender to set up a communication tunnel between each network interface and a second-level server;

the method comprises a step allowing for a self-discovery of the second-level servers and making it possible to set up communication tunnels between the second-level servers and the master server according to the first shared secret mechanism;

the method comprises a step making it possible to select a master server from among the second-level servers;

the step of transmitting, by each second-level server, the received IP address fragment to a single server, consists in transmitting said fragments to a single server called return server, said return server being able to reconstruct the IP address of the receiver and to synchronize the second-level servers in TCP exchanges with the receiver.

the method comprises steps consisting in:
- anonymously sending a data packet from the receiver to the return server;
- transmitting, from the return server to the selected second-level servers, data fragments generated via a third shared secret mechanism;
- transmitting, by each second-level server, the received data fragment to the first-level server which is assigned to it;
- transmitting, by each first-level server, the received data fragment to the sender; and reconstructing, by the sender, the data packet from all the received data fragments;

the second and the third shared secret mechanisms are the same.

The invention can operate in the form of a computer program product which comprises non-transient code instructions making it possible to perform the steps of the method claimed according to the different embodiments when the program is run on a computer. The term computer is understood to be nonlimiting and can cover any device such as a "set-top box", a smartphone, a fixed or roaming router for example, allowing for the execution of code instructions.

In one embodiment, the method can be implemented on a hardware card having two interfaces, in a "box" allowing communications for a home or an office.

Another subject of the invention is an anonymization device for communicating data in an IP communication network, from a sender having a plurality of network interfaces to a receiver having at least one IP address, the device comprising means for implementing the steps of the method claimed.

BRIEF DESCRIPTION OF THE DRAWINGS

Different aspects and advantages of the invention will emerge in support of the description of a preferred, but nonlimiting, implementation of the invention, with reference to the figures below.

DETAILED DESCRIPTION

Figure 1:
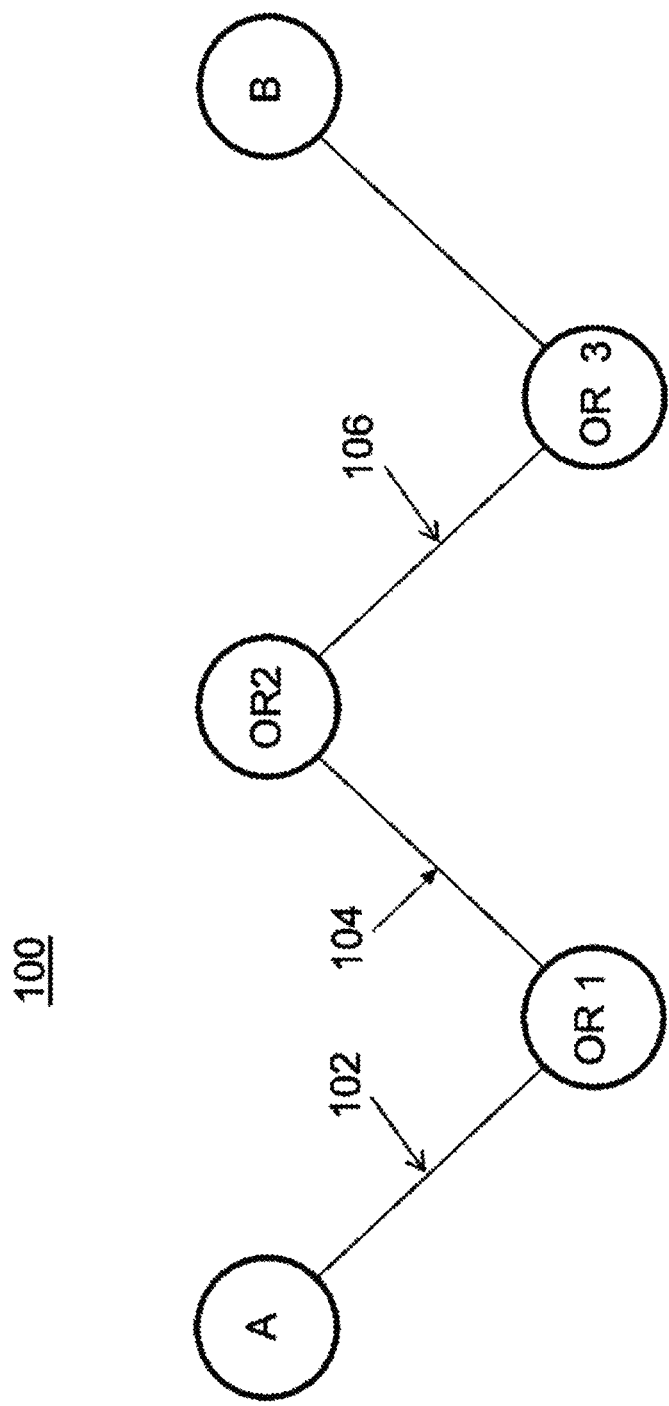
FIG. 1 illustrates, in a simplified manner, the setting up of circuits and the bidirectional routing in the Tor network.
Figure 2:
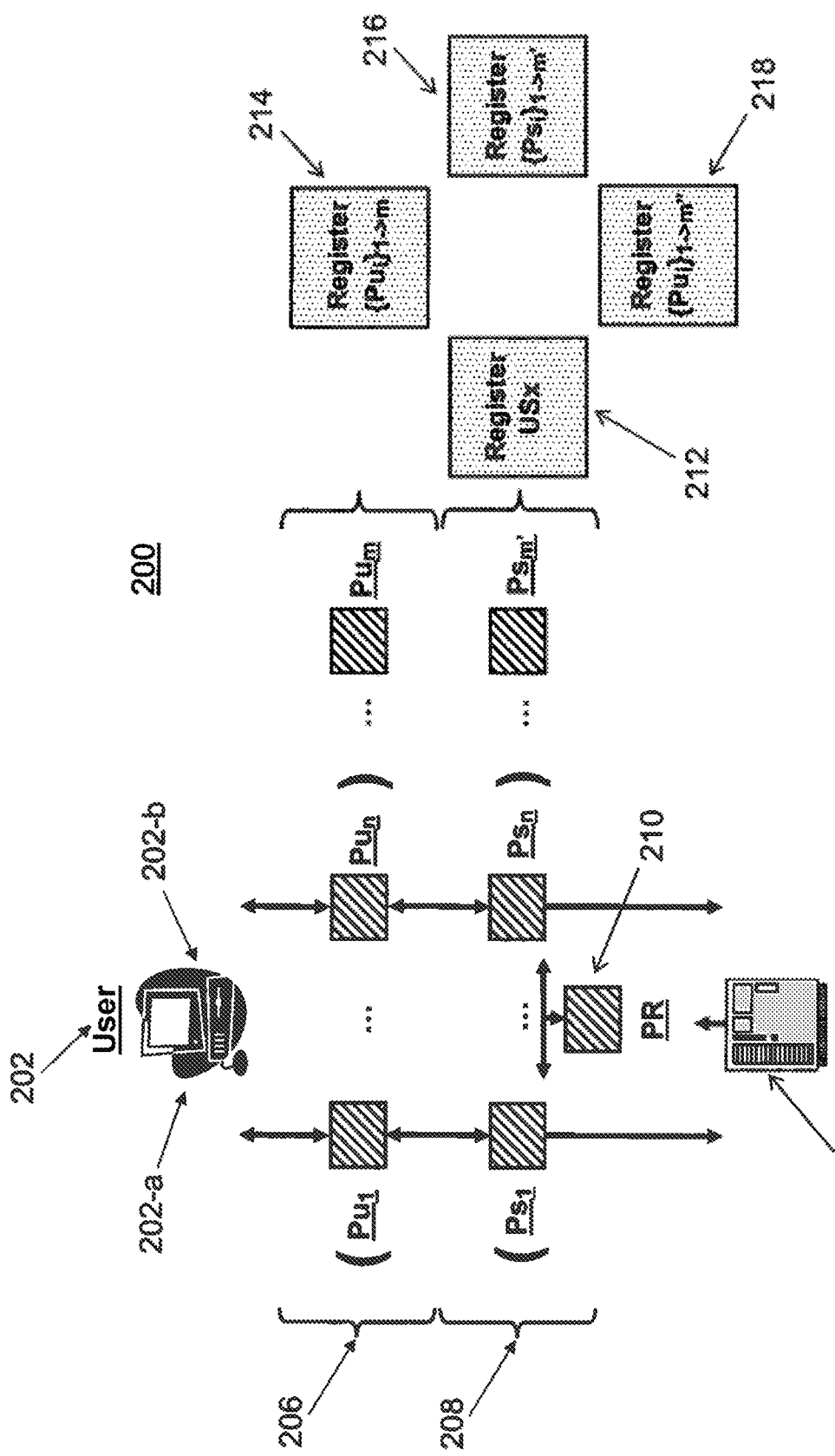
FIG. 2 illustrates a first embodiment of a server architecture allowing for the implementation of the invention.

The general principle of the invention is based on an architecture of distributed proxy type (200) illustrated in a simplified manner in FIG. 2, implementing several levels of servers placed in series, the servers of each level having complementary functions making it possible to implement an anonymized communication service. In the example illustrated, a user 'U' has an equipment item (202) to access a service (204) available at an address 'S'. The equipment item (202) has at least two network interfaces (202-a, 202-b) to connect to a communication network like the Internet, via Internet access providers (IAP). Preferentially, the interfaces are connected via independent access providers. In a variant implementation, the method of the invention can be operated on a communication device provided with two or more interfaces connected via one and the same IAP, or on a communication device provided with a single interface connected via different IAPs.

A first group of servers (206) called first-level servers (Pui), serves as point of entry to the anonymization service of an uplink flow from the user U to the service, and its function is to mask the IP addresses of the user from the rest of the anonymization system.

A second group of servers (208), called second-level servers (Psi), serves as exit point for an uplink flow from the user to the service, and its function is to mask the address 'S' of the service to everything upstream of the anonymization system, in particular to the Internet access providers of the user. The second group of servers also makes it possible to direct the uplink flow to the service via a master server. Preferentially, the master server is chosen from the group of the second-level servers.

An isolated server (210), called return server or downlink flow server (PR), serves as entry point for a downlink flow from the service to the user, and its function is to distribute the downlink flow from S to the second-level servers (Psi). It also has the function of synchronizing the second-level servers in their TCP exchanges with the service S.

In a variant embodiment, the master server and return server functions are hosted by the same machine.

The anonymization system also comprises several types of registers: a connection identifier register (212) between the sender and the receiver R[USx] to store a temporary identifier 'USx' which uniquely identifies a connection between the user equipment U and the service S. In a preferential implementation, the connection identifier USx is generated by U to uniquely identify its connection with S, and the register R[USx] is maintained by the second-level servers (Psi).

a register (214) dedicated to the first-level servers R[Pui] which contains a list of servers (Pui) from which the user equipment U can select first-level servers to be assigned to each of its interfaces to set up an anonymized communication. In a preferential implementation, the register R[Pui] is maintained by the first-level servers.

a register (216) dedicated to the second-level servers R[Psi] which contains a list of servers (Psi) from which the user equipment U can select second-level servers to be assigned to each first-level server. In a preferential implementation, the register R[Psi] is maintained by the second-level servers.

a register (218) dedicated to the return server R[PRi] contains a list of servers (PR) from which the user equipment U can select a return server. In a preferential implementation, the register R[PRi] is maintained by the return servers. In a particular embodiment, the return server PR can be a server selected from the group of the second-level servers.

In a particular embodiment, the respective assignment of the first-level servers $Pu_i$ and second level servers $Ps_i$ is done dynamically in order to increase the level of trust in the system. Advantageously, the choice of $Pu_i$ and $Ps_i$ being left to the user of the service, the latter is able to change the Pui and Psi even in the course of a TCP exchange.

In order also to increase the separation of the elements of the triplet (U, S, content), the assignment of the master server which is responsible for reconstructing the fragments received by the second-level servers and transferring them to S, can be done dynamically.

According to variant embodiments, the groups of servers $(Pu_i)$, $(Ps_i)$ and (PR) can each be segmented into several subgroups, making it possible to reduce the probability of information crossover via the monitoring of key elements of the Internet network (such as the operator "backbone", the underwater cables, etc.).

For the uplink flows from U to S, the implementation of the method of the invention in the distributed proxy architecture is based on steps of:

transfer, by the multiple interfaces of the user to the assigned second-level servers, of the IP address of the service S through a shared secret mechanism, said second-level servers informing the return server which reconstructs the complete address of S and communicates it to the assigned second-level servers;

transfer, by the multiple interfaces of the user to the first-level servers Pui, then to the second-level servers Psi, of the different data fragments of an original packet;

reassembly by the second-level master server, of the packets containing the different fragments of an original packet in the form of a single packet; and transfer of the reconstructed packet to S.

In the main variant, the original packet to be transmitted by U is firstly transformed via a shared secret mechanism into different fragments. Packets containing these different fragments are transmitted from U to the selected Psi via the Pui, and a master Psi reconstructs the original packet from these different fragments and sends it to S by representing itself as PR. Thus, for the recipient equipment S, everything takes place as if it received the original packet from PR.

In a variant, so-called collaborative embodiment, the fragments are sent directly by the Psi without prior reconstruction by the master Psi. The recipient S is configured to receive the fragments and to reassemble them in order to reconstruct the original packet sent by the user U which is intended for it.

For the downlink flows from S to U, the implementation of the method of the invention in the distributed proxy architecture is based on steps of:

sending of an original packet sent by S to the return server PR;

transfer of fragments of the original packet, obtained via the shared secret mechanism, from PR to the second-level servers Psi, then to the first-level servers Pui, then to U;

reassembly by U of the original packet.

Several implementations can be envisaged:

a management of the ICMP/TCP messages (reception acknowledgements, window control, etc.) directly by PR and therefore by the anonymization service, then necessitating recourse to a buffer at the (Psi) and PR levels. By its nature, this buffer increases the impact of a potential failure of the node concerned; or a non-management of the ICMP/TCP messages which risks culminating in a lowering of the quality of service of the anonymization service.

Figure 3:
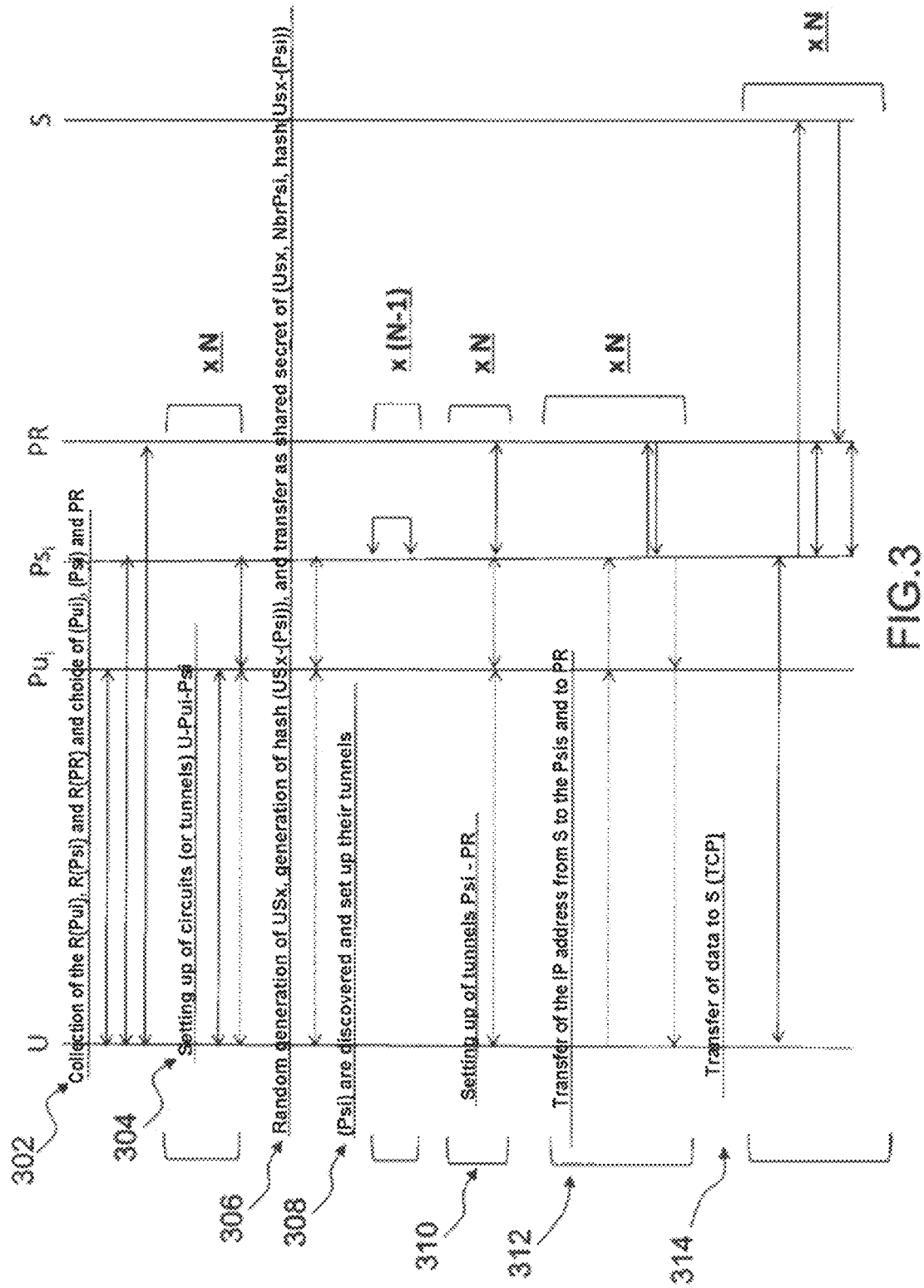
FIG. 3 is a flow diagram to illustrate the setting up of an anonymization connection according to an embodiment of the invention.

FIG. 3 illustrates the flows between the different entities (U, Pui, Psi, PR, S) of FIG. 2 that make it possible to set up an anonymization connection (300) according to an embodiment of the invention. In a first step (302), the sender U selects servers Pui, Psi and a return server PR by looking up the available servers in the corresponding registers R[Pui], R[Psi] and R[PR]. According to variant embodiments, the same number or a different number of servers $Pu_i$ and $Ps_i$ can be chosen. However, to avoid excessively easy information crossovers, the number of servers $Ps_i$ is preferentially greater than the number of servers $Pu_i$.

The sender U has, via the registers, a list of proxies for the first-level servers Pui that it is capable of authenticating and a list of proxies for the second-level servers Psi that it is capable of authenticating and with which it has a shared secret (or another cryptographic means of exchanging data confidentially).

The next step (304) consists in setting up circuits U-Pui between U and the first-level servers Pui. The sender U sends, through each of its interfaces, a circuit setup request to the Pui(s) chosen to be contacted through this interface. This circuit U-Pui is identified by a unique identifier, chosen randomly or not, by U. For each circuit U-Pui set up, the sender U informs the corresponding Pui of the second-level server Psi which is assigned to it. Each Pui is then able to forward the traffic incoming from U to the Psi which is assigned to it. Reciprocally, the downlink traffic is retransmitted from the recipient S to the Psis, then to the Puis and to U.

The next step (306) consists in setting up a shared secret with the second-level servers. The sender U generates a random number USx, preferentially of standardized size, which will uniquely and temporarily identify the connection. The method makes it possible to check whether this number is already present in the connection identifier register between the sender and the receiver R[USx]. If this number is not in the register R[USx], it reserves this number, otherwise it generates the procedure a second time. Then, the method makes it possible to transfer this identifier via a shared secret mechanism in order to mask it to the servers Pui. For that, the method makes it possible to generate a hash of the sequence {USx-(Psi)}, which will allow each Psi to confirm by itself its membership to the group of assigned second-level servers, by knowing its sender and its address, and by performing the hash function, it checks whether it obtains the same random number USx as that communicated by the sender U via the Puis.

Then, the sender U communicates to the Psis as shared secret, a packet of fixed size {USx-hash(USx-{Psi})} containing the hash sequence placed variably in the packet. The packet contains, in the header, an indicator of the position of the hash sequence and the number 'N' of Psis selected. This number N is necessary for each Psi to know the number of Psis with which it must collaborate in the context of the connection USx.

The next step (308) consists in setting up, for the connection USx, tunnels U-Psi between the sender U and the second-level servers Psi. On receipt of a packet sent by U, each Psi triggers the following self-discovery mechanism by sending the hash sequence {USx-hash(USx-(Psi))} contained in the packet to the group of the selected Psis. When two Psis are used, for example: Ps1 and Ps2, U sends the sequence hash({USx-hash({USx-IP_Ps1-IP_Ps2})})). For each hash sequence {USx-hash(USx-(Psi))} received by a Psj, the Psj calculates the hash({USx-Psi-Psj}) and checks that it does indeed correspond to the hash transmitted in the hash sequence. If the two hashes correspond, Psj has a guarantee that the Psi is indeed that with which it will have to cooperate for the USx concerned. When more than two Psis are used, this mechanism is put in place iteratively on all the Psis with an order of priority allocated to the (Psi) and the indication of the number 'N' of (Psi) to be considered in the self-discovery mechanism.

The next step (310) consists in setting up tunnels Psi-PR between the second-level servers Psi and the return server PR. This is done by communicating by shared secret the PR address to the Psis. For a maximum of confidentiality, that can be done immediately after the step of discovery of the Psis by incorporating, after the hash {USx-hash(USx-(Psi)), the IP address of PR as shared secret. The validation by PR of the different Psis assigned to the given USx can be done according to a validation mechanism similar to that used in the step of discovery of the Psis. Once the tunnels are set up, PR waits for the alerts from the Psis concerning the sending of data.

The next step (312) consists in communicating the address of S to the second-level servers Psi and to the return server PR. U transfers to the Psis via the shared secret the address of S which inform PR thereof. The return server reconstructs the complete IP address of S, then communicates it in return to the Psis. The Psis inform U that they are ready.

In the next step (314), U can communicate data to S by using the anonymization service. At the end of the exchanges, U disconnects sequentially from PR, from the Psis, releases the temporary random number USx of the register R[PR], and disconnects from the Puis.

The person skilled in the art can implement variants of the method (300) for setting up the anonymization service. Thus, the circuits U-Psi can be encrypted and therefore be tunnels by having Pui as bridge.

In other implementations:
- the (Pui), (Psi) and PR can be chosen dynamically: since the sender U controls the choice of these servers, it can choose to reinitialize the different (Pui), (Psi) and PR on demand. A high frequency of reinitialization makes it possible to increase the degree of anonymization, but to the detriment of performance (increase in latency);
- the number of connections supported between U and PR or the modes of transmission of the data packets between U and PR can be adjusted in order to obtain the best desired trade-off between privacy, general "overhead" and response time;
- the (Pui), (Psi) and (PR) selected for an anonymization service can be conserved for connections with other services to S in order to gain in performance;
- modifications of certain elements can be applied in order to increase the security while conserving a higher level of performance, such as additional encryption, mechanisms for validating Psi connections by PR for example.

Figure 4:
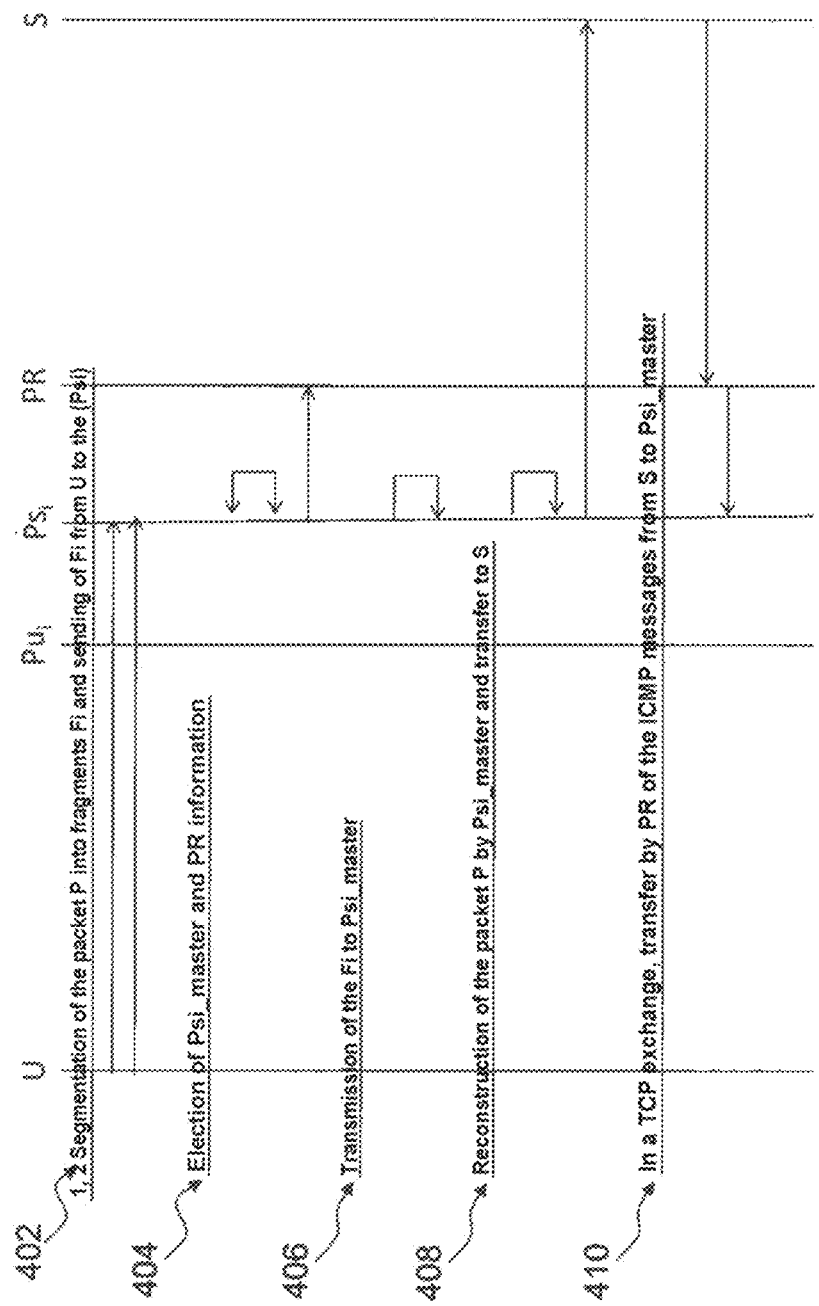
FIG. 4 is a flow diagram of an embodiment of the invention to illustrate the exchanges in an uplink flow.

FIG. 4 is a flow diagram of an embodiment of the invention to illustrate the exchanges (400) upon the transmission of a data packet P in uplink flow from U to S. The method (400) which reinforces the confidentiality of the data in uplink flow is based on setting up the anonymization context according to the method described with reference to FIG. 3.

A first step (402) consists in segmenting the packet P to be sent to S in a plurality of fragments Fi corresponding to the number of Puis. U applies a shared secret mechanism to the packet P to be sent and transmits, in the circuits U-Pui, a fragment Fi to the corresponding first-level server Pui via the interface chosen for this Pui. On receipt of the fragment Fi, the Pui transmits this fragment Fi to the Psi assigned in the negotiation (step 304) by following the circuit U_Pui_Psi which has been set up.

In a next step (404), a master server Psi_master is selected. For a greater confidentiality of the exchanges, the elected Psi remains master for a time predefined either by U, or randomly. The Psi_master is responsible for coordinating the Psis with PR and it informs the latter accordingly.

In a next step (406), all the Psis transmit their fragment Fi to the Psi_master.

In a next step (408), the Psi_master reconstructs the packet P, and transfers it to S. The server Psi_master can represent itself as the return server PR, by entering the PR address as sending address in the header of the packet P.

In the case of a TCP transmission, in the step (404), the Psi_master informs (405) the return server PR of its role as master. Then, after the step 408, S can then send (410) ICMP messages (window management and reception acknowledgements) to PR which will have to forward them to the Psi_master.

Figure 5:
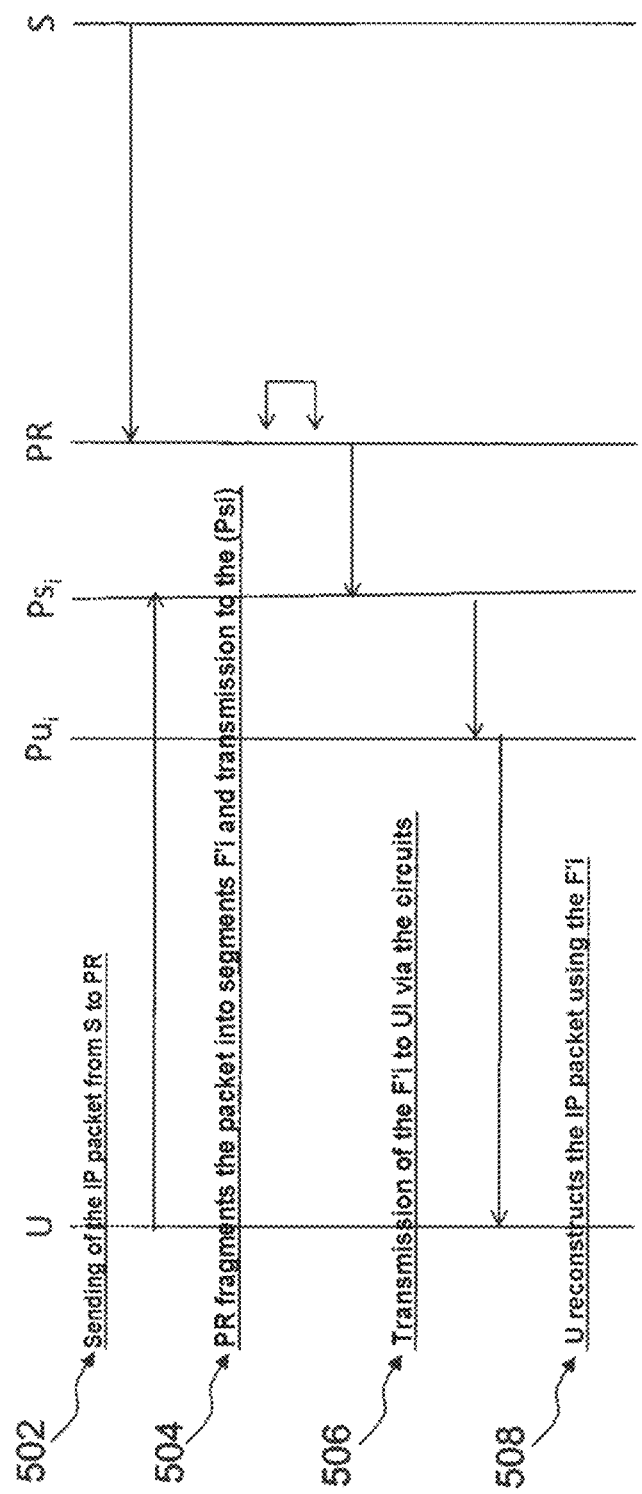
FIG. 5 is a flow diagram of an embodiment of the invention to illustrate the exchanges in a downlink flow.

FIG. 5 is a flow diagram of an embodiment of the invention to illustrate the exchanges (500) upon the transmission of a packet P in downlink flow from S to U. The method (500) which reinforces the confidentiality of the data in downlink flow is based on setting up the anonymization context described with reference to FIG. 3.

In a first step (502), the packet P is sent from S to PR, since PR appears to S as being the server communicating with it, the address of PR being entered in the "sender address" field of the packet P received by S.

On receipt of the packet, the server PR applies to it a shared secret mechanism which may or may not be the same as for the uplink flow, and transmits (504) the fragments $F'_i$ generated to the Psis which are concerned with the current communication and defined in the setting up of the anonymization service (method 300).

On receipt of a fragment, each Psi transmits (506) the fragment $F'_i$ received to U via the circuit U-Pui-Psi set up in the setting up of the anonymization service (300).

On receipt of all of the fragments, U reconstructs (508) the packet P sent by PR.

Figure 6:
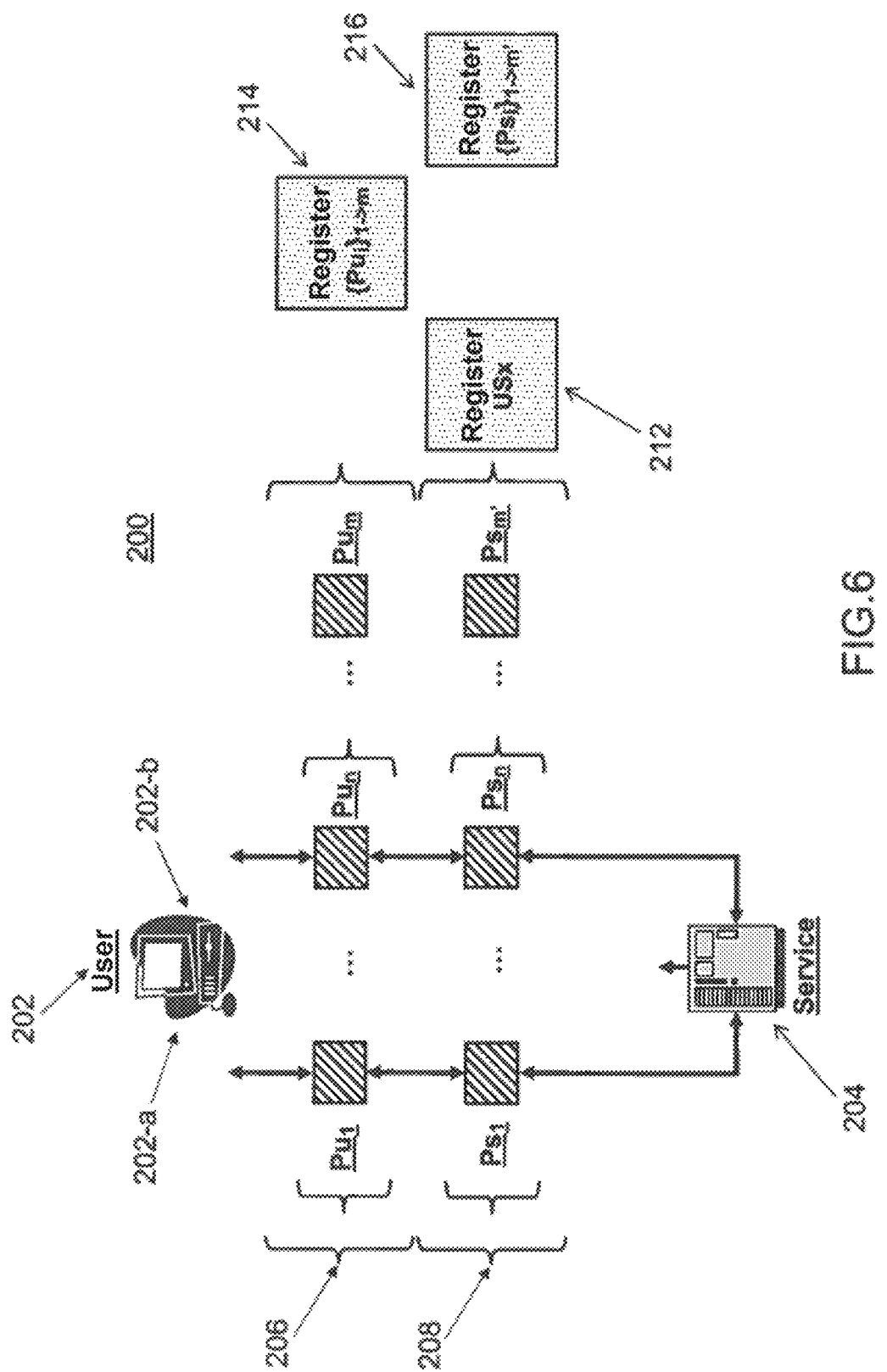
FIG. 6 illustrates a server architecture allowing for the implementation of the invention in a cooperative mode.

FIG. 6 illustrates a variant of the distributed proxy architecture of the servers of FIG. 2, allowing for the implementation of the invention in a collaborative or cooperative mode having an implementation of the protocol on a client and a server. In the collaborative mode, the return server PR becomes pointless, and there is no register R[PRi]. The collaborative mode allows two embodiments depending on whether S has made public the IP address of only one of its interfaces, or whether S has made public the IP address of all its different interfaces (Si). The uplink and downlink flows for these two collaborative variants are relatively simple since they do not require a PR, U transfers to S its fragments by shared secret via the different interfaces (Ui), fragments which are respectively received by the interfaces (Si) of S, allowing S to reconstruct the packets.

Figure 7:
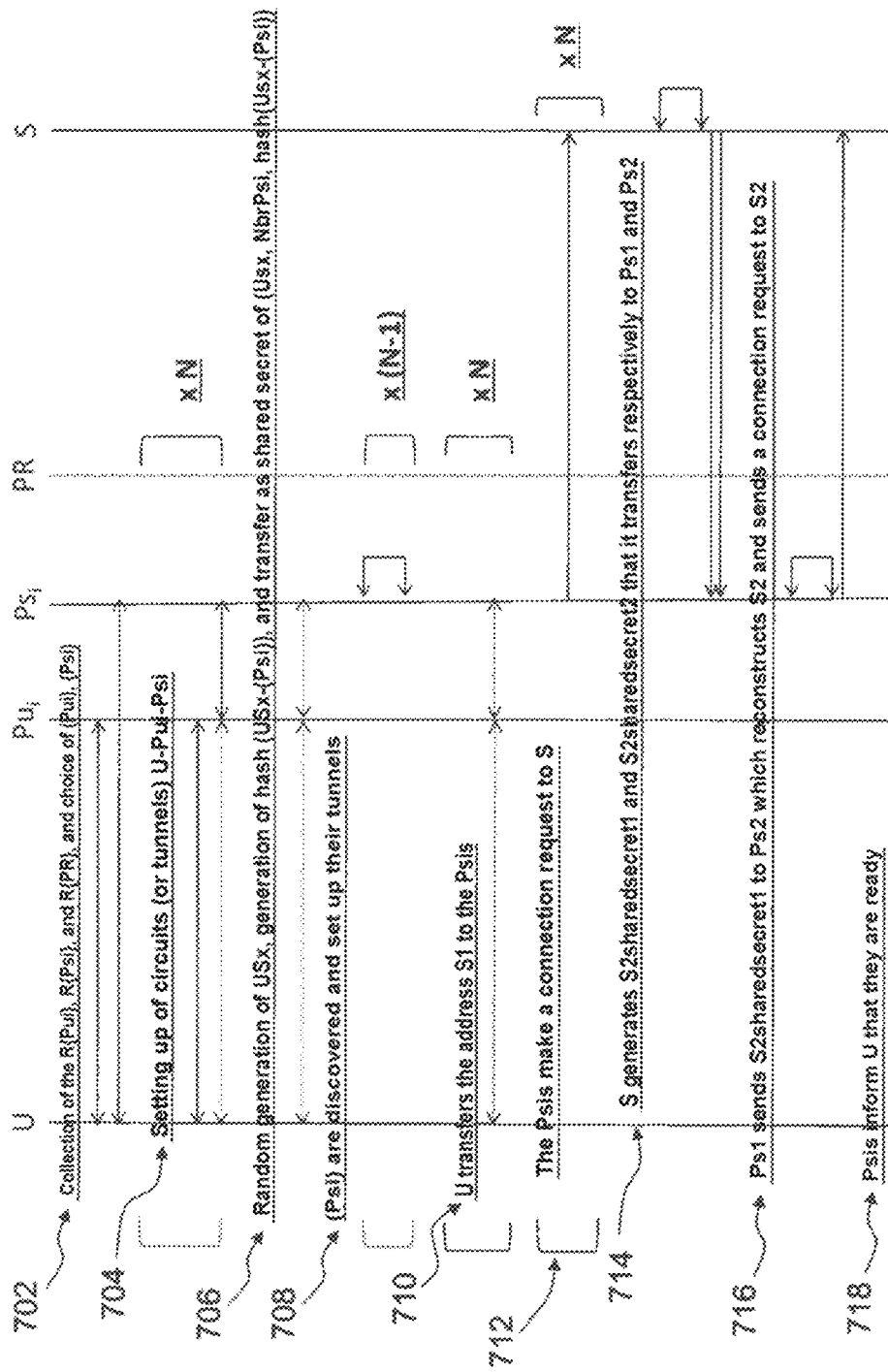
FIG. 7 is a flow diagram to illustrate the setting up of an anonymization connection according to a first variant of the cooperative mode.

FIG. 7 is a flow diagram to illustrate the setting up of an anonymization connection in collaborative mode in the case where S has made public, for example through the DNS service, the IP address of only one of its interfaces (S1 for example out of two interfaces S1 and S2). Generally, once the address of S1 has been communicated to the (Psi), a collaborative connection request is sent. In order for S to be able to communicate the address of its other interface S2 non-publicly, the collaborative connection request is initiated by the selected second-level servers (for example PS1 and PS2), which receive, in return, a reception acknowledgement from S confirming the collaborative mode connection agreement, and the IP address of the interface S2.

Compared to the non-collaborative mode variant illustrated by FIG. 3, the steps 702 to 708 are identical to the steps 302 to 308 and are not described again. It should be noted that, in the step 302 of selection of the first- and second-level servers, there is no selection of a return server PR in the embodiment of FIG. 7. Moreover, since the return server PR is pointless for this variant, the step 310 of setting up of the tunnels Psi-PR does not exist.

The method of FIG. 7 continues after the step 708 with a step (710) in which U transfers to the selected second-level servers the public address via a shared secret. In the next step (712), the Psis send to S a request for connection to the public interface 51.

In a next step (714), S generates two random numbers 'S2sharedsecret1' and 'S2sharedsecret2', such that, once recombined, they constitute the address of the non-public interface S2. S transfers a number respectively to each second-level server PS1 and PS2. Then (step 716) S sends, via the public interface S1, a reception acknowledgement comprising the connection agreement to Ps1 with the shared secret 'S2sharedsecret1', and sends, via the non-public interface S2, a reception acknowledgement to Ps2 comprising the connection agreement to Ps2 with the shared secret 'S2sharedsecret'.

In a next step (716), Ps1 sends its number 'S2sharedsecret1' to Ps2 which is then able, with its number 'S2sharedsecret2', to recalculate the non-public address S2, and can thus send to it a connection request.

In the next step (718), the second-level servers Psi inform U that they are ready for an anonymized communication. U can then communicate to S by using the anonymization service.

It should be noted that, at the end of the exchanges, U disconnects sequentially from the Psis, releases the temporary random number USx from the register R[PR], and disconnects from Pui.

The method of FIG. 7, which should not be considered to be limiting, has been described for a service S comprising two interfaces. If S has more than two interfaces, the steps 714 and 716 are performed to generate as many numbers of shared secrets as there are interfaces and transfer the addresses of the additional interfaces to the Psis.

Figure 8:
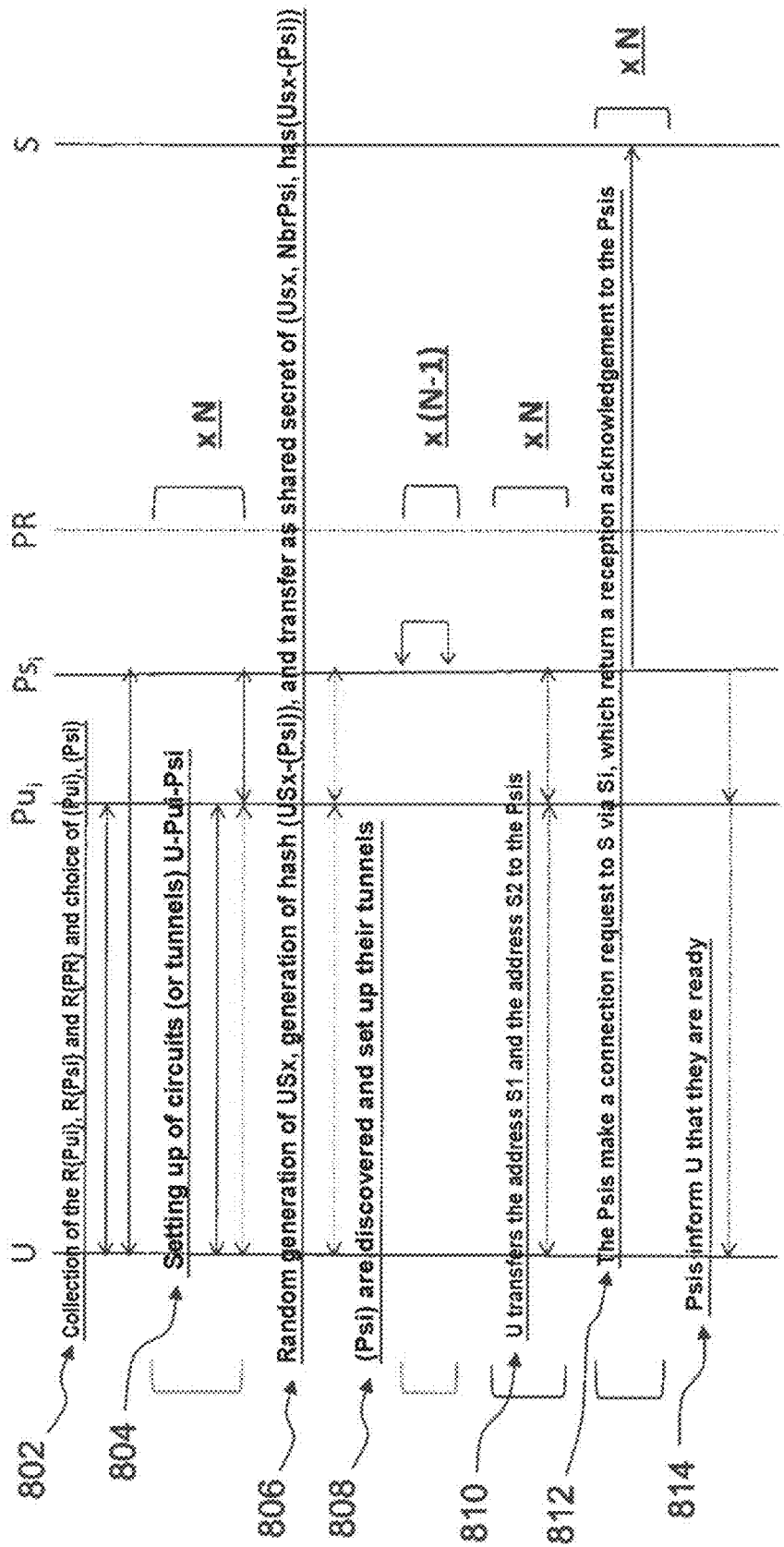
FIG. 8 is a flow diagram to illustrate the setting up of an anonymization connection according to another variant of the cooperative mode.

FIG. 8 is a flow diagram to illustrate the setting up of an anonymization connection in cooperative mode in the case where S has made public the IP addresses of all its different interfaces (for example S1 and S2 for the case illustrated), for example through an advanced service of DNS type taking account of the capacity of the services to have several interfaces.

Compared to the variant in non-collaborative mode illustrated by FIG. 3, the steps 802 to 808 are identical to the steps 302 to 308 and are not described again. It should be noted that, in the step 302 of selection of the first- and second-level servers (Pui, Psi), there is no selection of return server PR in the embodiment of FIG. 8. Moreover, since the return server PR is pointless for this variant, the step 310 of setting up of the tunnels Psi-PR does not exist.

The method of FIG. 8 continues after the step 708, with a step (810) in which U transfers to the selected second-level servers (Psi) the public addresses S1 and S2 via a shared secret. In a next step (812), each Psi respectively sends a connection request to the interfaces S1 and S2 of S, which in return sends a reception acknowledgement to the Psis.

In the next step (814), the Psis inform U that they are ready. U can then communicate to S by using the anonymization service.

It should be noted that, at the end of the exchanges, U disconnects sequentially from the Psis, releases the temporary random number USx from the register R[PR], and disconnects from Pui.

The method of FIG. 8, which should not be considered to be limiting, has been described for a service S comprising two interfaces. If S has more than two interfaces, the steps 810 and 812 are carried out for as many IP addresses as there are interfaces of the service S.

The present description which illustrates preferential and alternative implementations of the invention is not limiting.

The examples have been chosen to allow a good understanding of the principles of the invention, and a concrete application, but are not exhaustive and should allow the person skilled in the art to add modifications and variant implementations while conserving the same principles. The invention can be implemented from hardware and/or software elements. It can be available as a computer program product on a computer-readable medium. The medium can be electronic, magnetic, optical, electromagnetic or be of infrared type. Such media are, for example, semiconductor memories (Random Access Memory RAM, Read-Only Memory ROM), tapes, diskettes or magnetic or optical disks (Compact Disk—Read Only Memory (CD-ROM), Compact Disk—Read/Write (CD-R/W) and DVD).

The invention claimed is:

1. An anonymization method for communicating data in an IP communication network, from a sender to a receiver, the method comprising:
    setting up an anonymization connection between a sender having a plurality of network interfaces and a receiver having at least one IP address, by:
        selecting a plurality of first-level servers and assigning a first-level server to each network interface, wherein each of the assigned first-level server having a second key shared with the sender, and
        selecting a plurality of second-level servers and assigning a second-level server to respectively an assigned first-level server, wherein each of the assigned second-level server having a first key shared with the sender;
    transmitting, by each of the plurality of network interfaces, fragments of the IP address of the receiver respectively to an assigned second-level server, according to the first key;
    transmitting, by each assigned second-level server, the received IP address fragment to a single server called master server, said master server being able to reconstruct the IP address of the receiver;
    transmitting, by each of the plurality of network interfaces, data fragments of a data packet, to respectively the assigned first-level server, according to the second key;
    transmitting, by each assigned first-level server, the received data fragment to the respective assigned second-level server, wherein said assigned second-level server having received from the sender a fragment of the IP address of the receiver according to the first key;
    transmitting, by each assigned second-level server, the received data fragment to the master server, the master server being able to reconstruct the data packet from all the received data fragments; and
    transmitting, from the master server, the data packet to the receiver.

2. The method as claimed in claim 1, wherein transmitting, by each of the plurality of network interfaces, data fragments to respectively the assigned first-level servers, comprising:
    transforming the data packet to be transmitted into as many data fragments as there are network interfaces, said transformation of the packet being done according to the second key; and
    transmitting each data fragment to a first-level server via a different network interface, each first-level server being assigned to a network interface.

3. The method as claimed in claim 2, comprising, before transforming the data packet, allowing the sender to select and authenticate as many first-level servers as there are network interfaces from among the plurality of first-level servers, and to set up a single communication circuit between each network interface and a selected first-level server.

4. The method as claimed in claim 3, further comprising allowing the sender to select at least as many second-level servers as there are selected first-level servers, and to assign a selected second-level server to each selected first-level server, and informing each first-level server of an assigned second-level server.

5. The method as claimed in claim 1, wherein transmitting, to a plurality of second-level servers, fragments of the IP address of the receiver, comprises allowing the sender to set up a communication tunnel between each network interface and a second-level server.

6. The method as claimed claim 1, comprising allowing for a self-discovery of the second-level servers and establishing communication tunnels between the second-level servers and the master server according to the first key.

7. The method as claimed in claim 1, comprising selecting a master server from among the second-level servers.

8. The method as claimed in claim 1, wherein transmitting, by each assigned second-level server, the received IP address fragment to a single server, comprises transmitting said fragments to a single server called return server, said return server being able to reconstruct the IP address of the receiver and to synchronize the second-level servers in TCP exchanges with the receiver.

9. The method as claimed in claim 8, further comprising:
anonymously sending a data packet from the receiver to the return server;
transmitting, from the return server to the selected second-level servers, data fragments generated via a third key;
transmitting, by each second-level server, the received data fragment to an assigned first-level server;
transmitting, by each first-level server, the received data fragment to the sender; and
reconstructing, by the sender, the data packet from all the received data fragments.

10. The method as claimed in claim 9, wherein the second and third keys are identical.

11. A computer program product, said computer program comprising code instructions on a non-transitory computer readable medium configured to perform the method of claim 1, when said program is run on a computer.

12. An anonymization device, for communicating data in an IP communication network, from a sender having a plurality of network interfaces to a receiver having at least one IP address, the device having non-transitory computer readable medium configured to perform the method of claim 1.

* * * * *